(12) United States Patent
Wikström et al.

(10) Patent No.: US 11,541,810 B2
(45) Date of Patent: Jan. 3, 2023

(54) SYSTEM FOR REDUCING A BLIND SPOT FOR A VEHICLE

(71) Applicant: Scania CV AB, Södertälje (SE)

(72) Inventors: Fredrik Wikström, Södertälje (SE); Jonny Johansson, Grödinge (SE); Erik Dyrelius, Huddinge (SE); Per Back, Knivsta (SE)

(73) Assignee: Scania CV AB, Södertälje (SE)

( * ) Notice: Subject to any disclaimer, the term of this patent is extended or adjusted under 35 U.S.C. 154(b) by 652 days.

(21) Appl. No.: 16/075,944

(22) PCT Filed: Feb. 7, 2017

(86) PCT No.: PCT/SE2017/050109
§ 371 (c)(1),
(2) Date: Aug. 6, 2018

(87) PCT Pub. No.: WO2017/138866
PCT Pub. Date: Aug. 17, 2017

(65) Prior Publication Data
US 2020/0384917 A1 Dec. 10, 2020

(30) Foreign Application Priority Data
Feb. 10, 2016 (SE) .................. 1650166-0

(51) Int. Cl.
*B60R 1/00* (2022.01)
*H04N 5/232* (2006.01)

(52) U.S. Cl.
CPC ........... *B60R 1/00* (2013.01); *H04N 5/23299* (2018.08); *B60R 2300/101* (2013.01);
(Continued)

(58) Field of Classification Search
CPC ........ B60R 2300/202; B60R 2300/101; B60R 2300/105; B60T 2210/34
See application file for complete search history.

(56) References Cited

U.S. PATENT DOCUMENTS

| | | | |
|---|---|---|---|
| 6,919,917 | B1 | 7/2005 | Janssen |
| 7,006,129 | B1 * | 2/2006 | McClure ................... B60R 1/00 348/143 |

(Continued)

FOREIGN PATENT DOCUMENTS

| | | |
|---|---|---|
| CN | 101474981 A | 7/2009 |
| CN | 103171492 A | 6/2013 |

(Continued)

OTHER PUBLICATIONS

Dooley et al., A Blind-Zone Detection Method Using a Rear-Mounted Fisheye Camera With Combination of Vehicle Detection Methods, Aug. 31, 2015, IEEE, IEEE Transactions on Intelligent Transportation Systems (vol. 17, Issue: 1, Jan. 2016) (Year: 2015).*

(Continued)

*Primary Examiner* — Christian Chace
*Assistant Examiner* — Scott R Jagolinzer
(74) *Attorney, Agent, or Firm* — Moore & Van Allen PLLC; W. Kevin Ransom (57) ABSTRACT

Method and control unit for reducing a blind spot created by a field of view adjustment of a vehicle comprised presentational device intended to display objects outside a driver's direct field of vision. The method comprises: detecting the blind spot of the presentational device, based on signals received from at least one first sensor associated with the presentational device; adjusting at least one second sensor, not associated with the presentational device, in order to cover at least a part of the detected blind spot; and outputting information captured by the adjusted at least one second sensor.

17 Claims, 6 Drawing Sheets

(52) U.S. Cl.
CPC ... *B60R 2300/105* (2013.01); *B60R 2300/202* (2013.01); *B60R 2300/802* (2013.01)

(56) References Cited

U.S. PATENT DOCUMENTS

| | | | |
|---|---|---|---|
| 8,537,221 B2 | 9/2013 | Wagner et al. | |
| 9,129,495 B1* | 9/2015 | Stewart | G08B 13/19647 |
| 10,116,873 B1* | 10/2018 | Campbell | H04N 5/23293 |
| 2003/0122930 A1 | 7/2003 | Schofield et al. | |
| 2005/0012604 A1 | 1/2005 | Takahashi | |
| 2006/0066835 A1 | 3/2006 | Laufer et al. | |
| 2006/0215020 A1* | 9/2006 | Mori | B62D 15/0295 |
| | | | 348/119 |
| 2008/0122597 A1* | 5/2008 | Englander | B60Q 5/006 |
| | | | 340/433 |
| 2008/0169938 A1* | 7/2008 | Madau | B60R 1/12 |
| | | | 340/901 |
| 2009/0079585 A1* | 3/2009 | Chinomi | B60R 1/04 |
| | | | 348/E7.086 |
| 2010/0225762 A1* | 9/2010 | Augst | B60R 1/12 |
| | | | 348/148 |
| 2011/0043634 A1* | 2/2011 | Stegmann | B60R 1/00 |
| | | | 348/148 |
| 2011/0181728 A1* | 7/2011 | Tieman | B60R 1/00 |
| | | | 348/148 |
| 2012/0013742 A1* | 1/2012 | Fairchild | G06K 9/2054 |
| | | | 348/148 |
| 2012/0133768 A1 | 5/2012 | Stephan | |
| 2012/0314075 A1 | 12/2012 | Cho | |
| 2013/0063257 A1 | 3/2013 | Schwindt et al. | |
| 2014/0114534 A1 | 4/2014 | Zhang et al. | |
| 2014/0132770 A1 | 5/2014 | Lee et al. | |
| 2014/0306942 A1 | 10/2014 | Ahn | |
| 2015/0103172 A1* | 4/2015 | Shimizu | G06T 3/4038 |
| | | | 348/148 |
| 2015/0350607 A1* | 12/2015 | Kim | H04N 7/181 |
| | | | 348/148 |
| 2017/0151909 A1* | 6/2017 | Karabed | H04N 5/23218 |
| 2017/0225621 A1* | 8/2017 | Shiohara | H04N 7/181 |
| 2017/0232898 A1* | 8/2017 | Maejima | H04N 5/247 |
| | | | 348/118 |
| 2017/0291546 A1* | 10/2017 | Lai | B60R 1/00 |
| 2017/0327039 A1* | 11/2017 | Kimura | H04N 7/18 |
| 2018/0154831 A1* | 6/2018 | Spencer | H04N 5/265 |

FOREIGN PATENT DOCUMENTS

| | | | |
|---|---|---|---|
| CN | 104175956 A | | 12/2014 |
| DE | 19816054 A1 | | 10/1998 |
| EP | 1147032 A1 | | 10/2001 |
| EP | 2062778 A1 | | 5/2009 |
| JP | 2011189775 | * | 9/2011 |
| KR | 100774647 | * | 11/2007 |
| KR | 20140122879 | * | 9/2014 |

OTHER PUBLICATIONS

SCANIA CV AB, Chinese Application No. 201780009776.1, First Office Action, dated Oct. 12, 2020.
SCANIA CV AB, International Application No. PCT/SE2017/050109, International Preliminary Report on Patentability, dated Aug. 14, 2018.
SCANIA CV AB, European Application No. 17750519.5, Extended European Search Report, dated Jun. 13, 2019.
SCANIA CV AB, Russian Application No. 2018131361, Office Action, dated Apr. 23, 2019.
SCANIA CV AB, Korean Application No. 10-2018-7024933, Office Action, dated Jul. 30, 2019.
International Search Report for International Patent Application No. PCT/SE2017/050109 dated Apr. 27, 2017.
Written Opinion of the International Searching Authority for International Patent Application No. PCT/SE2017/050109 dated Apr. 27, 2017.
SCANIA CV AB, Chinese Patent Application No. 201780009776.1, Second Office Action, dated Jun. 3, 2021.
SCANIA CV AB, Chinese Patent Application No. 201780009776.1, Fourth Office Action, dated Mar. 14, 2022.

* cited by examiner

SYSTEM FOR REDUCING A BLIND SPOT FOR A VEHICLE

CROSS-REFERENCE TO RELATED APPLICATION(S)

This application is a National Stage Application (filed under 35 § U.S.C. 371) of PCT/SE2017/050109, filed Feb. 7, 2017 of the same title, which, in turn claims priority to Swedish Application No. 1650166-0 filed Feb. 10, 2016 of the same title; the contents of each of which are hereby incorporated by reference.

FIELD OF INVENTION

Provided is a method and a control unit in a vehicle having an adjusted presentational device intended to display objects outside a driver's direct field of vision. More particularly, a method and a control unit is described, for reducing a blind spot created by a field of view adjustment of the vehicle comprising the presentational device.

BACKGROUND

There are areas around a vehicle that are not visible for the driver, neither by direct vision nor indirectly with the help of a mirror. These areas are sometimes referred to as "blind spots" of the driver. The problems with visibility is in particular substantial in heavy vehicles such as trucks, and in particular for trucks with trailers, due to the length of the vehicle equipage.

There is then a risk of an accident if the driver of the vehicle changes direction when an object is situated in such blind spot of the driver.

A possible solution to this to this problem may be to redirect one of the rear view mirrors from its default direction in order to display an object which is present in such mirror blind spot. However, unfortunately a new blind spot is then created, which may be equally dangerous from a traffic security perspective as the first blind spot, which was eliminated by adjusting the rear view mirror direction. So, the cover up of the first blind spot by adjustment of the rear view mirror leads to the creation of a second blind spot of that rear view mirror, etc.

Adding extra mirrors or adding sensors, like e.g. cameras, covering the blind spots may solve or at least reduce the problem. However, additional mirrors and/or sensors are expensive. It is also difficult to install in a convenient way and present the information concerning coverage of the blind spot to the driver in a convenient manner. Further, additional vehicle external mirrors will add air resistance and thus also increase fuel consumption.

Another known solution is to use wide-angle mirrors/cameras, instead or in addition to the existing rear view mirror. Thereby blind spots may be at least partly covered, but unfortunately wide-angle mirrors/cameras affect the perspective. Objects situated close to the wide-angle mirror/camera seems bigger/closer than they are in reality, while objects situated further away seems smaller/more distant than they are in reality. Such distorted view may confuse or disorientate the driver, which may lead to accidents due to inappropriate driver reactions on discovered objects.

It is also known to replace a conventional mirror of a vehicle with a side view camera and a presentational device such as a display. An advantage is that air resistance may be reduced. However, the above discussed problems with blind spots are not solved by such replacement.

At the opposite, such side view camera may malfunction, due to exposure for dirt, accidental damage or vandalism.

Documents US20120314075 and DE19816054 disclose systems on vehicles comprising side cameras and reverse cameras, where one or more of the cameras are adjustable. Document US20120133768 presents a system wherein the viewing angle of the reverse camera on the vehicle is adjustable. However, none of these documents present a solution to the problem of avoiding that the cover up of a first blind spot leads to the creation of another blind spot. Neither are these documents discussing cooperation between the different cameras on a vehicle for this purpose.

Documents US2014114534 and US2006066835 both illustrate systems in vehicles comprising a plurality of cameras replacing rear view mirrors. The cameras may have narrow or wide viewing angle. Neither in these documents are however the above discussed problem solved.

It would thus be desired to improve rear view mirrors of vehicles in order to reduce problems associated with blind spots.

SUMMARY OF THE INVENTION

It is therefore an object of this invention to solve at least some of the above problems and improve the traffic security.

According to a first aspect of the invention, this objective is achieved by a method in a vehicle for reducing a blind spot created by a field of view adjustment of a vehicle comprising the presentational device intended to display objects outside a driver's direct field of vision. The method comprises detecting the blind spot of the presentational device, based on signals received from a first sensor associated with the presentational device. Further the method also comprises adjusting a second sensor, not associated with the presentational device, in order to cover at least a part of the detected blind spot. The method in addition comprises outputting information captured by the adjusted second sensor.

According to a second aspect of the invention, this objective is achieved by a control unit in a vehicle. The control unit aims at reducing a blind spot created by a field of view adjustment of a vehicle comprising the presentational device intended to display objects outside a driver's direct field of vision. The control unit is configured to detect a blind spot of the presentational device, based on signals received from a first sensor associated with the presentational device. Further, the control unit is configured to generate control signals to adjust a second sensor, not associated with the presentational device, in order to cover at least a part of the detected blind spot. Furthermore, the control unit is additionally configured to generate control signals to information captured by the adjusted second sensor.

Thanks to the described aspects, by covering at least a part of a blind spot of the presentational device intended to display objects outside a driver's direct field of vision, by adjusting another sensor, such as a reversing sensor or forward directed sensor, at least a part of the emerged blind spot may be covered. By redirecting or adjusting the viewing angle of assisting sensors, already present in the vehicle for other purposes, the emerged blind spots may be at least partly covered without requirements for additional sensors. Thereby the problems of blind spots around the vehicle may be eliminated or at least reduced without increased sensor costs. Thus increased traffic security is achieved.

Other advantages and additional novel features will become apparent from the subsequent detailed description.

BRIEF DESCRIPTION OF THE DRAWINGS

Embodiments of the invention will now be described in further detail with reference to the accompanying figures, in which.

DETAILED DESCRIPTION OF THE INVENTION

Embodiments of the invention described herein are defined as a method and a control unit, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
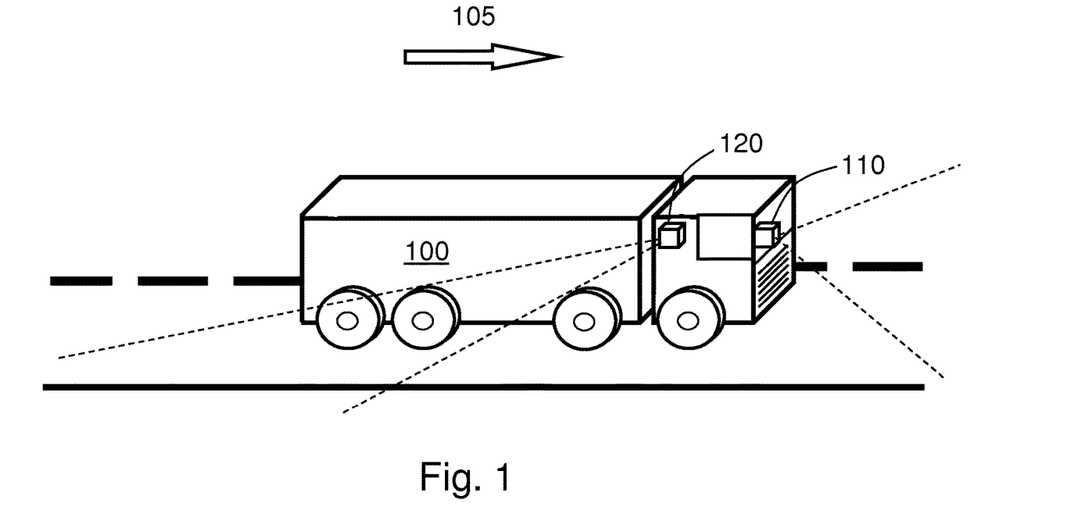
FIG. 1 illustrates a vehicle according to an embodiment of the invention.

FIG. 1 illustrates a scenario with a vehicle 100. The vehicle 100 is driving on a road in a driving direction 105.

The vehicle 100 may comprise e.g. a truck, a bus or a car, or any similar vehicle or other means of conveyance.

Further the vehicle 100 may comprise a first set of sensors, comprising one or more side view sensors 120. The first set of sensors are associated with a respective presentational device. The side view sensor 120 may be situated at the side of the vehicle 100, arranged to detect objects at the side of the vehicle 100. The side view sensor 120 may comprise e.g. a camera, a stereo camera, an infrared camera, a video camera, a radar, a lidar, an ultrasound device, a time-of-flight camera, or similar in different embodiments.

The first set of sensors 120 may be normally utilised during transportation of the vehicle 100 and the usage may be regulated by legal restrictions.

The vehicle 100 may also comprise a second set of sensors, not associated with the presentational device. The second set of sensors may comprise e.g. a forwardly directed sensor 110 and/or a reverse sensor. In the illustrated embodiment, which is merely an arbitrary example, the sensor 110 may be situated e.g. at the front of the vehicle 100, behind the windscreen of the vehicle 100. An advantage by placing the sensor 110 behind the windscreen is that the sensor 110 is protected from dirt, snow, rain and to some extent also from damage, vandalism and/or theft.

The second set of sensors may be additional to legal requirement sensors for assisting the driver e.g. in particular situations such as when driving in reverse direction and/or road lane detection.

The sensor 110 may be directed towards the front of the vehicle 100, in the driving direction 105. The sensor 110 may comprise e.g. a camera, a stereo camera, an infrared camera, a video camera, a radar, a lidar, an ultrasound device, a time-of-flight camera, or similar in different embodiments.

In some embodiments, the sensors 110, 120 may comprise e.g. a motion detector and/or be based on a Passive Infrared (PIR) sensor sensitive to a person's skin temperature through emitted black body radiation at mid-infrared wavelengths, in contrast to background objects at room temperature; or by emitting a continuous wave of microwave radiation and detect motion through the principle of Doppler radar; or by emitting an ultrasonic wave an detecting and analysing the reflections; or by a tomographic motion detection system based on detection of radio wave disturbances, to mention some possible implementations.

Instead of using traditional rear view mirrors comprising reflective elements on the vehicle 100, side view sensors 120 in combination with one or more devices intended to display objects outside a driver's direct field of vision may be used. Such presentational device may comprise e.g. a display, a projector, a Head-Up Display, a transparent display being part of the windshield, intelligent glasses of the driver, etc., which output an image, or stream of images, captured by a corresponding associated sensor 120. Typically, the side view sensor 120 on the left side of the vehicle 100 may be associated with a presentational device on the left side of the cabin while the side view sensor 120 on the right side of the vehicle 100 may be associated with a presentational device on the right side of the cabin, even if other combinations are possible.

However, such presentational device intended to display objects outside a driver's direct field of vision may in some embodiments comprise a reflecting element such as e.g. represented by a (rear view) mirror.

The sensors 110, 120 may be turned and/or re-directed in different directions and the devices intended to display objects outside a driver's direct field of vision may present the adjusted view of the associated sensor 120.

The side view sensors 120 may according to some embodiments be directed based on information captured by the sensors 120, which information may be analysed for detecting how surrounding objects are moving in relation to the vehicle 100. Thereby, the side view sensor 120 may identify e.g. if another vehicle is on its way to disappear into a blind spot of the driver, around the vehicle 100.

It is thereby possible to utilise side view sensors 120/presentation devices with a normal viewing angle and instead follow the detected and identified object, for minimizing or at least reducing the risk that the driver does not detect the other vehicle. In some alternative embodiments, e.g. when changing direction is not enough, the viewing angle may be changed into a wider angle.

However, when the side view sensor 120 and the corresponding presentational device are adjusted, i.e. turned in another direction than a predetermined or default direction, a new blind spot emerges. According to some embodiments, other sensors in the vehicle 100, not associated with the presentational device may be used for covering the emerged blind spot. An example may be to redirect a reversing sensor when driving in the driving direction 105, or redirecting the forward sensor 110 when going in the opposite direction. Alternatively, the viewing angle of the assisting sensor may be adjusted, typically widened, in order to minimise or at least reduce the emerged blind spot.

In order to know how much the forward sensor 110 or reverse sensor has to be adjusted, the physical distances between the respective sensor and the side view sensor 120 may have to be measured and stored in a memory. Alternatively, when images from the respective sensors 110, 120 are overlapping each other, the distance may be calculated by also knowing the vehicle velocity from the vehicle speedometer and measure the time it takes for a detected object to appear within the view angle of the two sensors 110, 120. In some embodiments, also yaw rate may be used when calculating how the vehicle 100 is moving laterally.

The above discussed example of adjusting the side view sensor 120/presentation device in order to track an object is merely an arbitrary example of how and why a blind spot may be created by redirection of the side view sensor 120.

In some embodiments, the forwardly directed sensor 110 and/or the reverse sensor may be used for substituting the side view sensor 120 in case of malfunction of the side view sensor 120.

Thereby, the driver's visibility of the close surroundings of the vehicle 100 is improved by adjustment of other on-board sensors, which may be already existing on the vehicle 100 for other purposes such as the forward directed sensor 110 and/or the revering sensor. Traffic security is thereby enhanced, while additional costs are kept small.

Figure 2A:
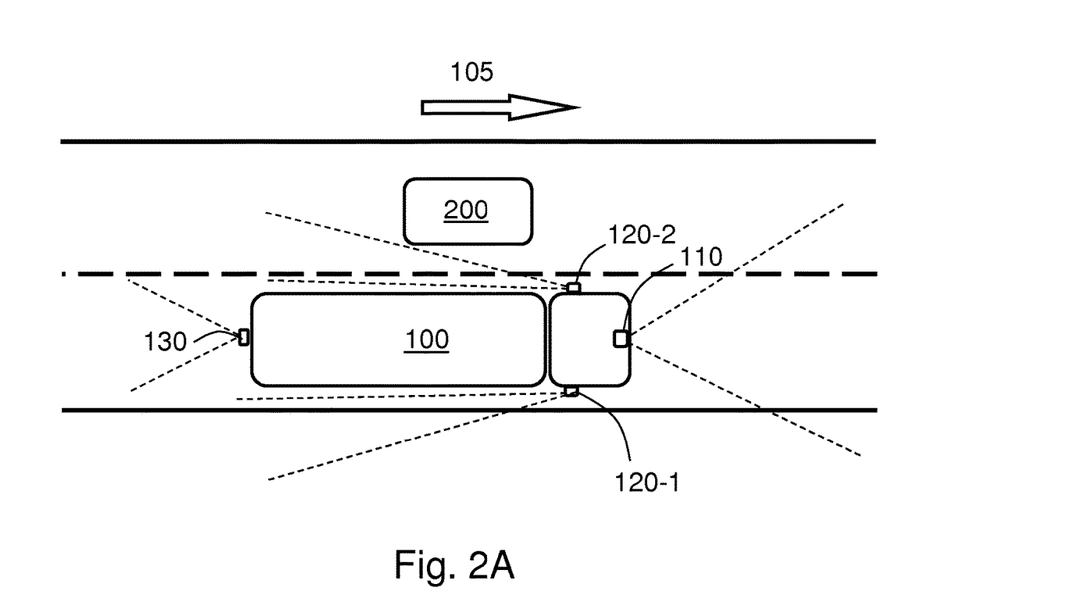
FIG. 2A illustrates an example of a traffic scenario and an embodiment of the invention.

FIG. 2A schematically illustrates a scenario, similar to the previously discussed scenario illustrated in FIG. 1, but with the vehicle 100 seen from an above perspective and wherein an object 200 is depicted.

The object 200 may be a vehicle, a human, an animal, a lamp post or e.g. any other imaginable item.

When the vehicle 100 is driving in the driving direction 105, the forward directed sensor 110 may detect the object 200 in this illustrated scenario, when the vehicle 100 is approaching the object 200 from behind. An image recognition program may recognise the object 200 and categorise it as e.g. pedestrian, car, bicyclist, animal, lamp post etc.; or into stationary/non-stationary objects 200, for example, in some embodiments.

Information concerning the detected and possibly identified object 200 may then be utilised, also when the object 200 is no longer within capture range of the forward directed sensor 110, according to some embodiments.

In other embodiments, the object 200 may be approaching the vehicle 100 from behind and overtaking the vehicle 100. The reverse sensor 130 may then be utilised for the above described detection and recognition.

As the vehicle 100 is driving forward in the driving direction 105, the object 200 becomes situated in a blind spot where it is neither possible for the driver to see it directly, by the forward looking sensor 110 nor by the side looking sensor 120-2 and the corresponding presentational device.

It may be noted that the vehicle 100 may have additional sensors such as reversing camera 130, in some embodiments, which may be utilised for the same purpose as the forward directed sensor 110 when driving backwards, in some embodiments.

Figure 2B:
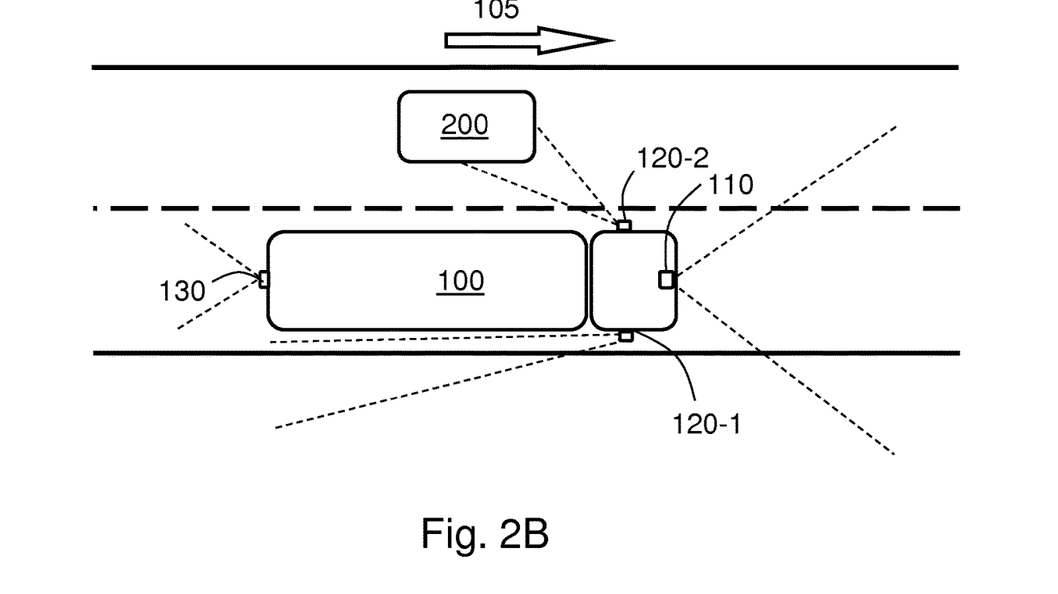
FIG. 2B illustrates an example of a traffic scenario and an embodiment of the invention.

FIG. 2B illustrates a moment in time after the scenario illustrated in FIG. 2A.

The side looking sensor 120-2 on the left side of the vehicle 100 in the direction of travel 105 is directionally adjusted to cover the object 200 which was situated outside a current or default view of the device intended to display objects 200 outside a driver's direct field of vision in the scenario of FIG. 2A.

The default view of the side looking sensor 120-2 and the corresponding device may be in a configurable rear view position.

Thus the detected object 200 may be tracked by the adjusted sensor 120-2 and a representation of the detected object 200 may be outputted by the presentation device associated with the sensor 120-2.

Thereby, the driver becomes aware of the object 200 at the left side of the own vehicle 100 and is enabled to continue the driving with that vehicle in mind. By maintaining the same viewing angle of the sensor 120-2 and the presentational device, distance estimation of the object 200 in relation to the own vehicle 100 is facilitated for the driver.

Further, in some embodiments, the side looking sensor 120-2 and the corresponding device may return to the default view in some embodiments, e.g. when the detected object 200 no longer is situated at the side of the vehicle 100 and/or when another object enters the zone at the left side of the vehicle 100.

However, when the side looking sensor 120-2 is redirected, a new blind spot emerges at the left side of the vehicle 100, in the area that was covered by the side looking sensor 120-2 in FIG. 2A. A first solution to this problem is presented in FIG. 2C and an alternative solution is presented in FIG. 2D.

Figure 2C:
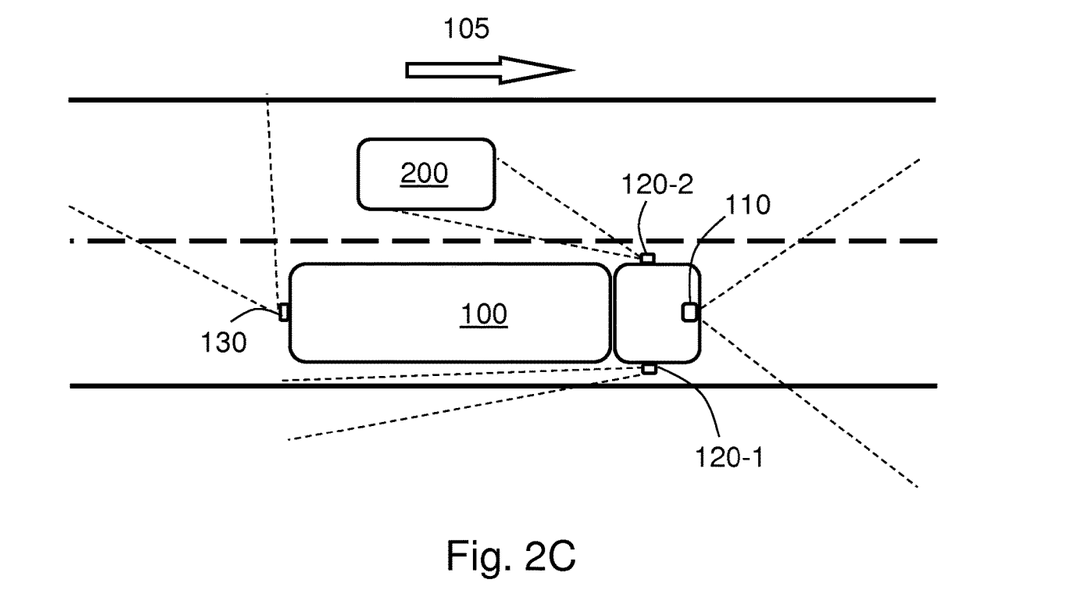
FIG. 2C illustrates an example of a traffic scenario and an embodiment of the invention.

FIG. 2C illustrates a moment in time after the scenario illustrated in FIG. 2B.

The reversing sensor 130 has been adjusted to cover the left side of the vehicle surroundings. Thereby, the blind spot that emerged when the side looking sensor 120-2 on the left side of the vehicle 100 was directed to track the vehicle 100 becomes at least partly covered by the reversing sensor 130.

In some embodiments when the vehicle 100 is moving in the reverse direction, opposite to the forward direction 105, the forwardly directed sensor 110 may be utilised and directed in the same way.

In some embodiments, the assisting sensor 110, 130 may be redirected into a default or predetermined direction when the side looking sensor 120-1, 120-2 is redirected into a default or predetermined direction e.g. when the detected object 200 no longer is situated at the side of the vehicle 100.

Figure 2D:
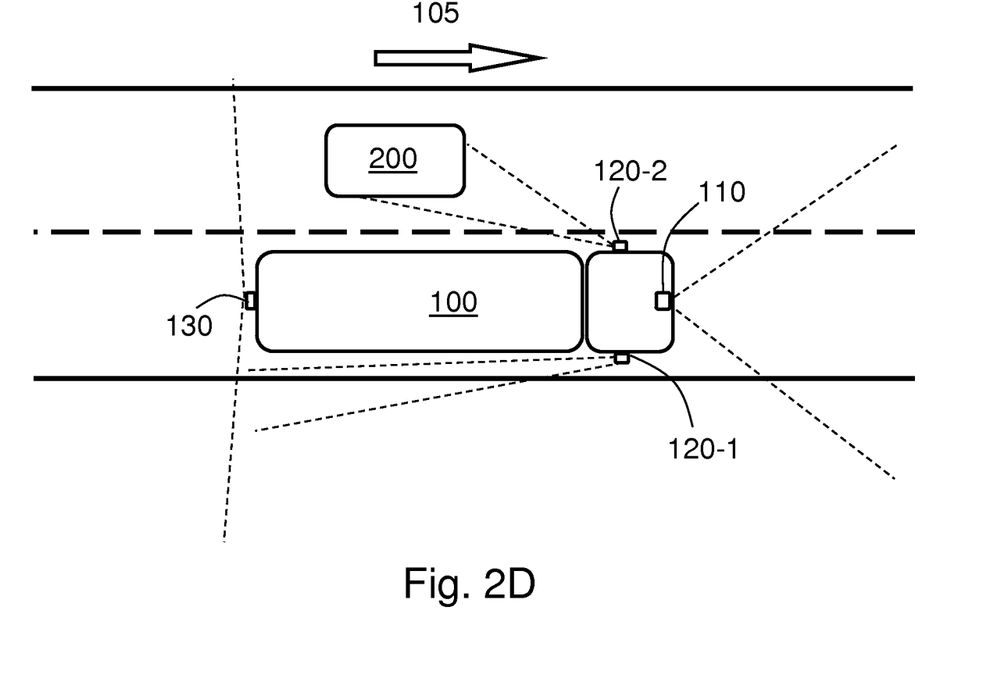
FIG. 2D illustrates an example of a traffic scenario and an embodiment of the invention.

FIG. 2D illustrates a moment in time after the scenario illustrated in FIG. 2B wherein a solution alternative to the one illustrated in FIG. 2C is presented.

The backward looking sensor 120-1 on the right side of the vehicle 100 is adjusted to cover the object 200 which was situated in the blind spot in the scenario of FIG. 2B by adjusting the viewing angle.

Thereby, the blind spot that emerged when the side looking sensor 120-2 on the left side of the vehicle 100 was directed to track the vehicle 100 becomes at least partly covered by the reversing sensor 130, while avoiding creation of a new blind spot due to redirection of the reversing sensor 130. The perspective may be somewhat distorted, however the view of the reversing sensor 130 is not so crucial for the driver when driving in the driving direction 105, as it may be more important to be aware of an object 200 at the side of the own vehicle 100 than the precise distance to the object 200.

Figure 3:
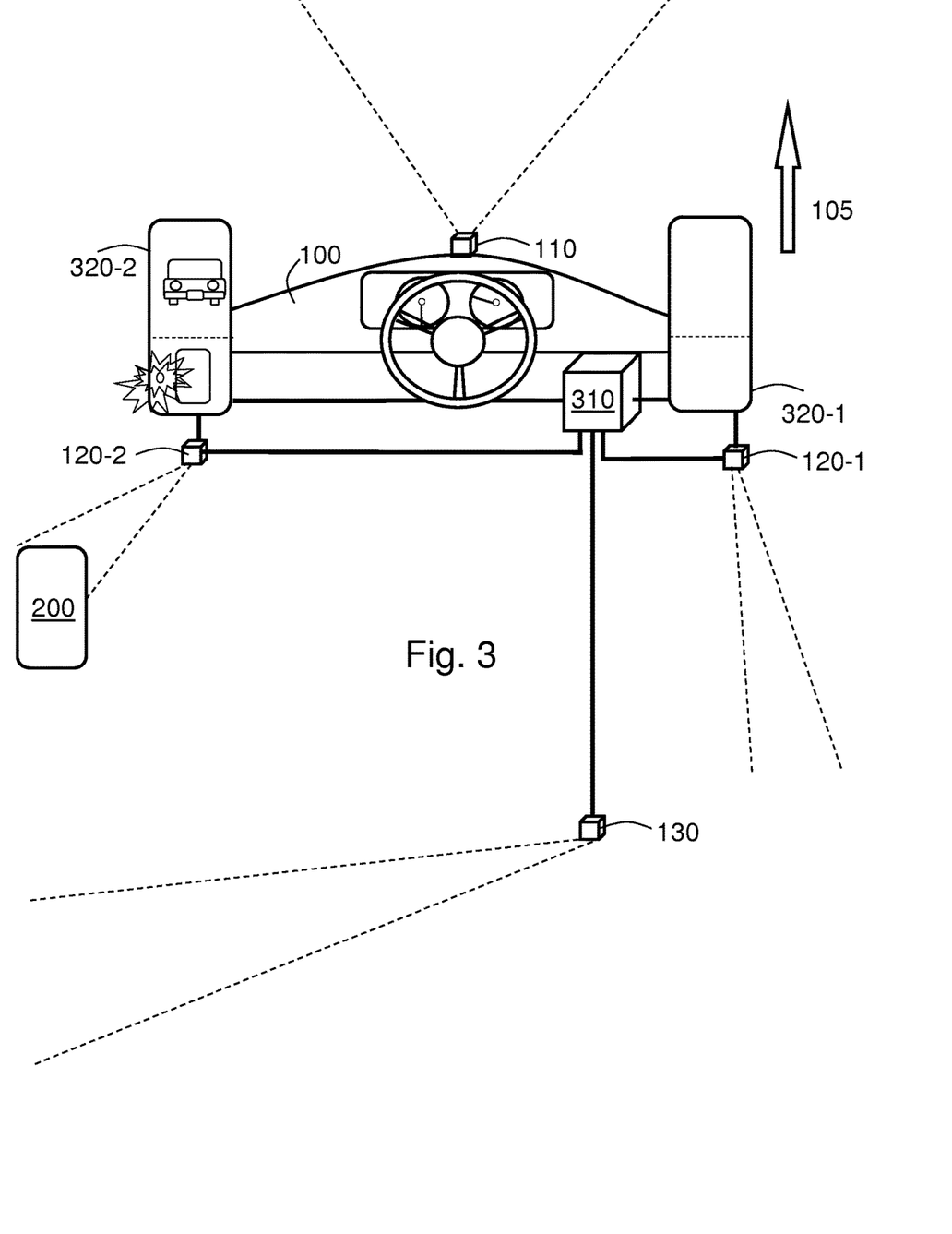
FIG. 3 illustrates an example of a vehicle interior according to an embodiment.

FIG. 3 illustrates an example of a vehicle interior of the vehicle 100 and depicts how the previously scenario in FIG. 1 and/or FIG. 2A-2D may be perceived by the driver of the vehicle 100.

The vehicle 100 comprises a control unit 310, a right side device 310-1 intended to display objects 200 outside a driver's direct field of vision, situated on the right side of the vehicle 100, and a left side device 310-2 intended to display objects 200 outside a driver's direct field of vision, situated on the left side of the vehicle 100. Each such device 310-1, 310-2 is associated with a respective sensor 120-1, 120-2, situated on the corresponding side of the vehicle 100.

The sensors 120-1, 120-2 may typically comprise a respective (video) camera. However, in other embodiments, the vehicle 100 may comprise a plurality of sensors 120 on each side of the vehicle 100. The sensors 120 may be of the same, or different types, such as e.g. a camera, a stereo camera, an infrared camera, a video camera, a radar, a lidar, an ultrasound device, a time-of-flight camera, or similar device in different embodiments.

The presentational devices 310-1, 310-2 may comprise a display, a projector, a Head-Up Display, a transparent display being part of the windshield, intelligent glasses of the driver, etc., which output an image, or stream of images, captured by the corresponding sensor 120-1, 120-2. Alternatively, the presentational devices 310-1, 310-2 may comprise a reflective element or mirror, such as e.g. a rear view mirror. A part of the presentational device 310-1, 310-2 may output an image presenting a view from another sensor, such as e.g. the reverse sensor 130, the forward looking sensor 110, or any other sensor. Alternatively, in some embodiments, an overview of a representation of the vehicle 100 may be displayed, where information concerning the surroundings of the vehicle 100 captured from the various sensors 110, 120-1, 120-2, 130 on-board the vehicle 100 is presented, as illustrated in FIG. 3. Thereby the attention of the driver is put to the fact that the left presentational device 320-2 has an adjusted coverage area, in comparison with the default coverage area.

The control unit 310 is able to detect the object 200, situated out of the "normal", default, or currently utilised view in the left presentational device 320-2, based on sensor signals provided by the left side sensor 120-2. Also, the control unit 310 is further configured to generate control signals for tracking the detected object 200 by adjusting the sensor 120-2 and outputting a representation of the detected object 200 by said device 320-2. In the illustrated example, the left side sensor 120-2 is redirected from the "normal", or default coverage area into the area where the object 200 is situated. The view of the redirected sensor 120-2 is then displayed in the left presentational device 320-2.

This is merely an illustrative non limiting example of redirected side looking sensor 120-1, 120-2 and corresponding presentational device 320-1, 320-2. The solution for covering at least a part of a blind spot may be applied when the side looking sensor 120-1, 120-2 is redirected for any reason, or e.g. when the side looking sensor 120-1, 120-2 is defective.

Thereby, by adjusting another sensor 110, 130 than the sensor 120-2 associated with the presentational device 320-2, the risk of an accident due to an object 200 appearing in the emerged blind spot of the driver is reduced, as the driver is made aware of the object 200 and its position in relation to the own vehicle 100.

The control unit 310 may communicate with the sensors 110, 120-1, 120-2, 130, e.g. via a communication bus of the vehicle 100, or via a wired or wireless connection.

Figure 4:
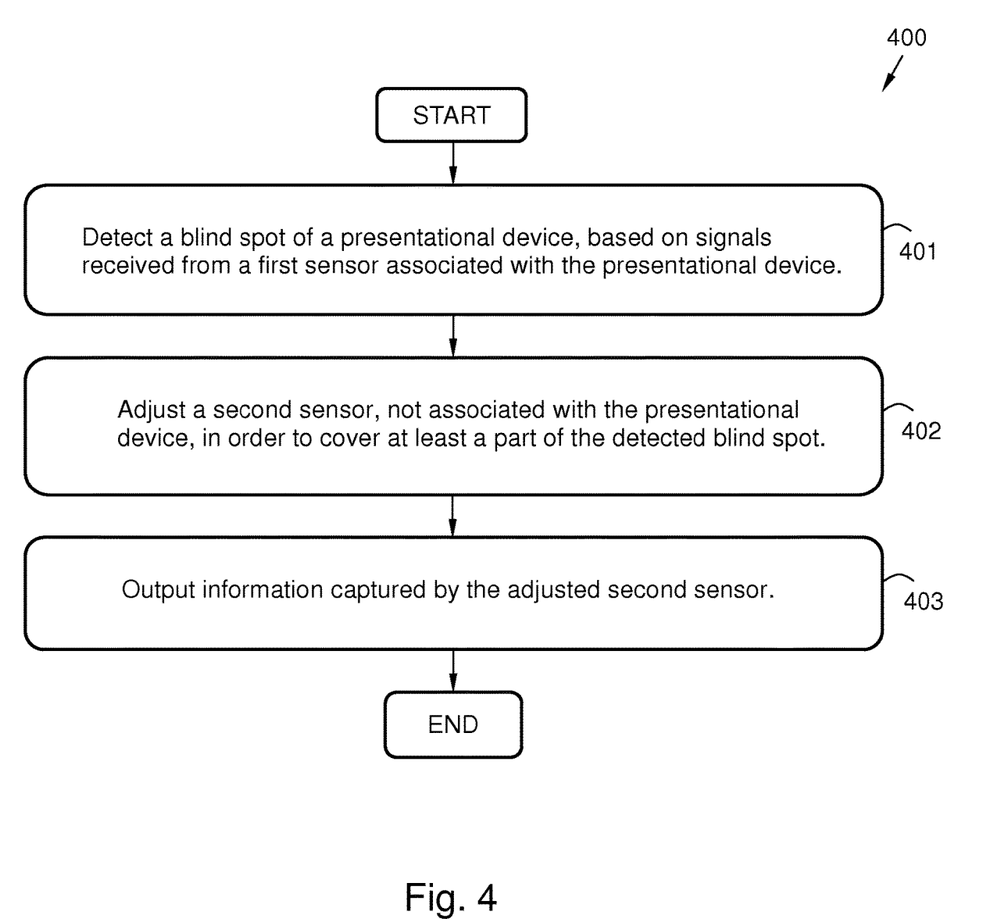
FIG. 4 is a flow chart illustrating an embodiment of the method.

FIG. 4 illustrates an example of a method 400 according to an embodiment. The flow chart in FIG. 4 shows the method 400 for use in a vehicle 100. The method 400 aims at reducing a blind spot created by a field of view adjustment of a vehicle comprising the presentational device 320-1, 320-2 intended to display objects 200 outside a driver's direct field of vision.

The vehicle 100 may be e.g. a truck, a bus, a car, or similar means of conveyance.

The object 200 may be a vehicle, a human, an animal, a lamp post or e.g. any other imaginable item.

The vehicle 100 further comprises a first set of sensors 120-1, 120-2, each associated with a respective presentational device 320-1, 320-2 of the vehicle 100. The first set of sensors 120-1, 120-2 may be adjusted by turning them, e.g. into a detected object 200, in order not to change the angle of view outputted to the driver. Further, the vehicle 100 comprises a second set of sensors 110, 130, such as e.g. a forwardly directed sensor 110 and/or a reversely directed sensor 130 and making adjustments by turning or adjusting the viewing angle in order to reduce the detected blind spot.

In order to correctly be able to compensate for the emerged blind spot due to redirection of the view adjustment, the method 400 may comprise a number of steps 401-403. Some of these steps 401-403 may be performed in various alternative manners. Further, the described steps 401-403 may be performed in a somewhat different chronological order than the numbering suggests. The method 400 may comprise the subsequent steps:

Step 401 comprises detecting the blind spot of the presentational device 320-1, 320-2, based on signals received from a first sensor 120-1, 120-2, associated with the presentational device 320-1, 320-2.

The detected blind spot may be the result of redirection of the first sensor 120-1, 120-2, for any arbitrary reason, or malfunctioning of the first sensor 120-1, 120-2, in some embodiments.

Step 402 comprises adjusting a second sensor 110, 130, not associated with the presentational device 320-1, 320-2, in order to cover at least a part of the detected 401 blind spot.

The adjustment may be made by turning the second sensor 110, 130 into an area that at least partly cover the detected 401 blind spot.

However, in some embodiments, the adjustment may be made by adjusting the viewing angle of the second sensor 110, 130, typically by widening the viewing angle of the second sensor 110, 130.

Thereby the emerged blind spot of a first sensor 120-1, 120-2 may be at least partly covered by the second sensor 110, 130, which reduces the risk of having an undetected object 200 in the surroundings of the vehicle 100.

Step 403 comprises outputting information captured by the adjusted 402 second sensor 110, 130.

In some embodiments, the information of the second sensor 110, 130 may be outputted by the presentational device 320-1, 320-2, e.g. in a dedicated part of the presentational device 320-1, 320-2. However, in other embodiments, the information may be outputted in a separate presentational device such as e.g. a display.

Figure 5:
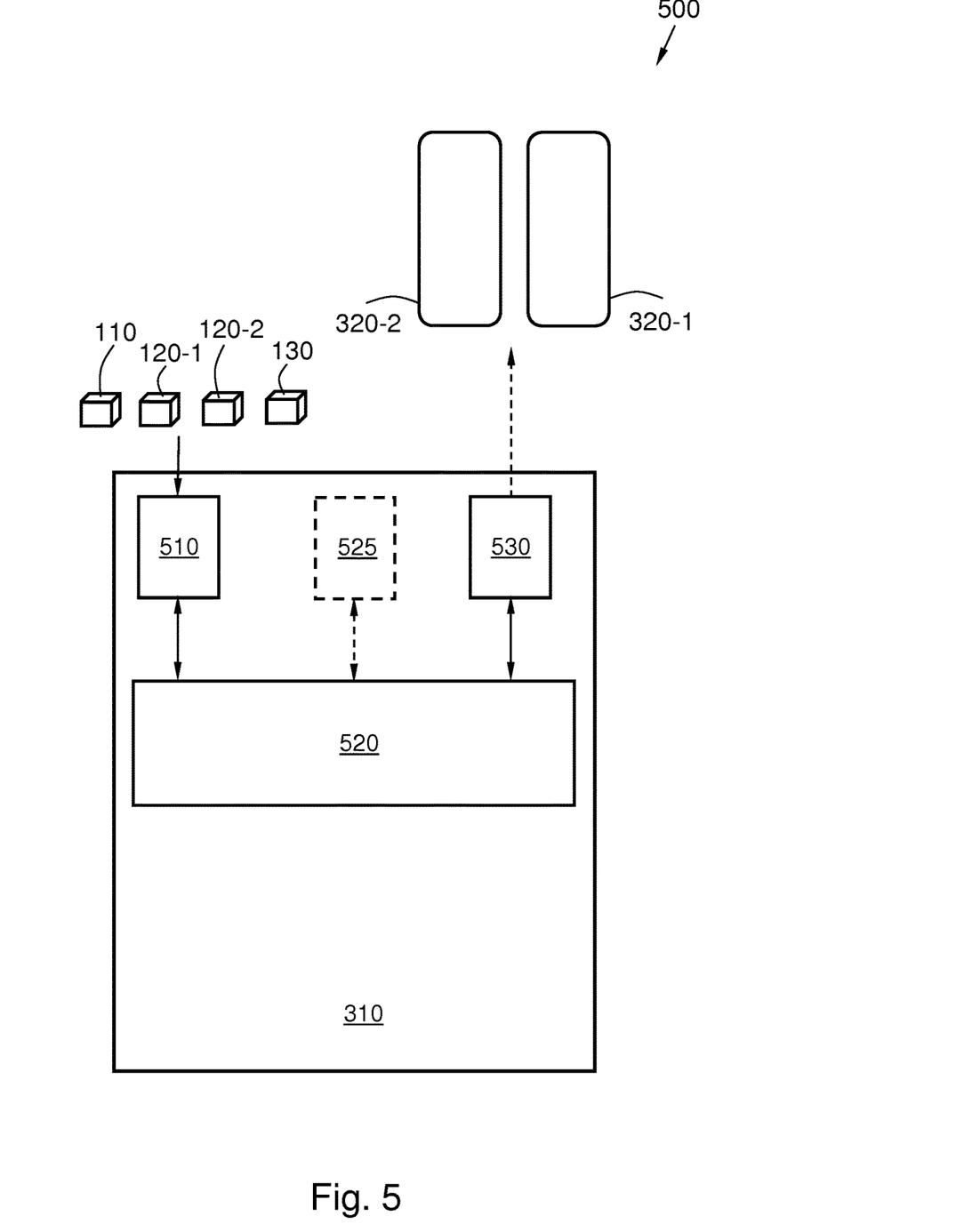
FIG. 5 is an illustration depicting a system according to an embodiment.

FIG. 5 illustrates an embodiment of a system 500 for reducing a blind spot created by a field of view adjustment of a vehicle comprising the presentational device 320-1, 320-2 intended to display objects 200 outside a driver's direct field of vision. The system 500 may perform at least some of the previously described steps 401-403 according to the method 400 described above and illustrated in FIG. 4.

The system 500 comprises at least one control unit 310 in the vehicle 100. The control unit 310 is arranged for reducing a blind spot created by a field of view adjustment of a vehicle comprising the presentational device 320-1, 320-2 intended to display objects 200 outside a driver's direct field of vision.

The control unit 310 is configured to detect a blind spot of the presentational device 320-1, 320-2, based on signals received from a first sensor 120-1, 120-2 associated with the presentational device 320-1, 320-2. Further the control unit 310 is configured to generate control signals to adjust a second sensor 110, 130, not associated with the presentational device 320-1, 320-2, in order to cover at least a part of the detected blind spot. In addition, the control unit 310 is configured to generate control signals to information captured by the adjusted second sensor 110, 130.

In some embodiments, the control unit 310 may be configured to generate control signals to adjust the second sensor 110, 130 by turning.

Alternatively, in some embodiments, generate control signals to adjust the second sensor 110, 130 by adjustment of the viewing angle.

Furthermore, the control unit 310 may also be configured to generate control signals for adjusting any sensor 120-1, 120-2 associated with the presentational device 320-1, 320-2 of the vehicle 100 by turning, in order not to change the angle of view outputted to the driver. The control unit 310 may also be configured to generate control signals for adjusting the second sensor 110, 130 by turning or adjusting the viewing angle in order to reduce the detected blind spot.

The control unit 310 may comprise a receiving circuit 510 configured for receiving a signal from the first sensor 120-1, 120-2 and the second sensor 110, 130, e.g. via a bus of the vehicle 100.

Further, the control unit 310 comprises a processor 520 configured for performing at least some steps of the method 400, according to some embodiments.

Such processor 520 may comprise one or more instances of a processing circuit, i.e. a Central Processing Unit (CPU), a processing unit, a processing circuit, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the control unit 310 may comprise a memory 525 in some embodiments. The optional memory 525 may comprise a physical device utilised to store data or programs, i.e., sequences of instructions, on a temporary or permanent basis. According to some embodiments, the memory 525 may comprise integrated circuits comprising silicon-based transistors. The memory 525 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 310 may comprise a signal transmitter 530 in some embodiments. The signal transmitter 530 may be configured for transmitting a signal to e.g. the presentational device 320-1, 320-2, or a display, for example.

In addition, the system 500 also comprises at least one first sensor 120-1, 120-2, associated with the presentational device 320-1, 320-2. Typically, the system 500 may comprise one right side sensor 120-1 associated with a right side presentational device 320-1 and a left side sensor 120-2 associated with a left side presentational device 320-2.

The system 500 further comprises at least one second sensor 110, 130, not associated with the presentational device 320-1, 320-2.

The sensors 110, 120-1, 120-2, 130 may comprise e.g. a camera, a stereo camera, an infrared camera, a video camera or similar device as previously exemplified, of the same or different types in different embodiments.

The above described steps 401-403 to be performed in the vehicle 100 may be implemented through the one or more processors 520 of the control unit 310, together with computer program product for performing at least some of the functions of the steps 401-403. Thus a computer program product, comprising instructions for performing the steps 401-403 in the control unit 310 may perform the method 400 comprising at least some of the steps 401-403 for reducing a blind spot created by a field of view adjustment of a vehicle comprising the presentational device 320-1, 320-2 intended to display objects 200 outside a driver's direct field of vision, when the computer program is loaded into the one or more processors 520 of the control unit 310.

Further, some embodiments of the invention may comprise a vehicle 100, comprising the control unit 310, configured to reduce a blind spot, according to at least some of the steps 401-403.

The computer program product mentioned above may be provided for instance in the form of a data carrier carrying computer program code for performing at least some of the steps 401-403 according to some embodiments when being loaded into the one or more processors 520 of the control unit 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 310 remotely, e.g., over an Internet or an intranet connection.

The terminology used in the description of the embodiments as illustrated in the accompanying drawings is not intended to be limiting of the described method 400; the control unit 310; the computer program; the system 500 and/or the vehicle 100. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A method for use in a vehicle for reducing a blind spot associated with a presentational device associated with the vehicle, where the presentational device is intended to display objects outside a driver's direct field of vision, wherein a field of view of the presentational device is directed in a first specified direction at a side of the vehicle based on detections from a first sensor associated with the presentational device, wherein the first sensor is directed at the first specified direction for detecting objects located at the side of the vehicle within the first specified field of view of the presentational device, said method comprising:
   detecting an object approaching a side of the vehicle;
   controlling the first sensor to alter its field of view so as to track the object with the first sensor, as the object moves beside the vehicle longitudinal to a direction of travel of the vehicle;
   detecting a blind spot at the side of the vehicle of the presentational device, based on signals received from the at least one first sensor, wherein the blind spot is created as the first sensor alters its field of view while tracking the object as the object moves along the side of the vehicle;
   adjusting at least one second sensor with a second specified field of view to be redirected from a second specified direction that is directed at one of a front or a back of the vehicle to the first specified direction at the side of the vehicle such that the second specified field of view of the second sensor covers at least a portion of the second specified field of view and the first specified field of view of the presentation device so as to thereby cover at least a part of the detected blind spot;
   outputting information captured by the at least one second sensor in the first specified direction at the side of the vehicle;
   detecting that the object has moved past the side of the vehicle;
   redirecting the field of view of the first sensor to a default field of view so that the blind spot created when the first sensor tracked the object is now covered by the field of view of the first sensor; and
   redirecting the second sensor back to the second field of view.

2. The method according to claim 1, wherein adjusting comprises turning the at least one second sensor.

3. The method according to claim 1, wherein adjusting comprises adjusting a viewing angle of the at least one second sensor.

4. The method according to claim 1, wherein adjusting comprises adjusting the at least one first sensor associated with the presentational device of the vehicle by turning of the sensor, in order not to change an angle of view outputted to the driver while adjusting the at least one second sensor comprising at least one of turning of the at least one second senor or adjusting a viewing angle of the at least one second sensor in order to reduce the detected blind spot.

5. The method according to claim 1, wherein the second specified field of view of the at least one second sensor at least partially overlaps with the specified field of view for the presentational device.

6. A control unit in a vehicle for reducing a blind spot associated with a presentational device associated with the vehicle, where the presentational device is intended to display objects outside a driver's direct field of vision, wherein a field of view of the presentational device is directed in a first specified direction at a side of the vehicle based on detections from a first sensor associated with the presentational device, wherein the first sensor is directed at the first specified direction for detecting objects located at the side of the vehicle within the first specified field of view of the presentational device, said control unit configured to:
   detect an object approaching a side of the vehicle;
   control the first sensor to alter its field of view so as to track the object with the first sensor, as the object moves beside the vehicle longitudinal to a direction of travel of the vehicle;
   detect a blind spot at the side of the vehicle of the presentational device, based on signals received from the at least one first sensor, wherein the blind spot is created as the first sensor alters its field of view while tracking the object as the object moves along the side of the vehicle;
   adjust at least one second sensor with a second specified field of view to be redirected from a second specified direction that is directed at one of a front or a back of the vehicle to the first specified direction at the side of the vehicle such that the second specified field of view of the second sensor covers at least a portion of the second specified field of view and the first specified field of view of the presentation device so as to thereby cover at least a part of the detected blind spot;
   output information captured by the at least one second sensor in the first specified direction at the side of the vehicle;
   detect that the object has moved past the side of the vehicle;
   redirect the field of view of the first sensor to a default field of view so that the blind spot created when the first sensor tracked the object is now covered by the field of view of the first sensor; and
   redirect the second sensor back to the second field of view.

7. The control unit according to claim 6, wherein the control signals are used to adjust the at least one second sensor by turning the at least one second sensor.

8. The control unit according to claim 6, wherein the control signals are used to adjust the at least one second sensor by adjustment of a viewing angle of the second sensor.

9. The control unit according to claim 6, wherein the control signals are used for:
   adjusting the at least one first sensor associated with the presentational device of the vehicle by turning of said at least one sensor, in order not to change an angle of view outputted to the driver; and
   adjusting the at least one second sensor by at least one of turning or adjusting a viewing angle in order to reduce the detected blind spot.

10. A computer program product comprising computer program code stored on a non-transitory computer-readable medium, said computer program product for use in a vehicle for reducing a blind spot associated with a presentational device associated with the vehicle, where the presentational device is intended to display objects outside a driver's direct field of vision, wherein a field of view of the presentational device is directed in a first specified direction at a side of the vehicle based on detections from a first sensor associated with the presentational device, wherein the first sensor is directed at the first specified direction for detecting objects located at the side of the vehicle within the first specified field of view of the presentational device, said computer program product comprising computer instructions to cause at least one control unit to perform the following operations:

detecting an object approaching a side of the vehicle;

controlling the first sensor to alter its field of view so as to track the object with the first sensor, as the object moves beside the vehicle longitudinal to a direction of travel of the vehicle;

detecting a blind spot at the side of the vehicle of the presentational device, based on signals received from the at least one first sensor, wherein the blind spot is created as the first sensor alters its field of view while tracking the object as the object moves along the side of the vehicle;

adjusting at least one second sensor with a second specified field of view to be redirected from a second specified direction that is directed at one of a front or a back of the vehicle to the first specified direction at the side of the vehicle such that the second specified field of view of the second sensor covers at least a portion of the second specified field of view and the first specified field of view of the presentation device so as to thereby cover at least a part of the detected blind spot;

outputting information captured by the at least one second sensor in the first specified direction at the side of the vehicle;

detecting that the object has moved past the side of the vehicle;

redirecting the field of view of the first sensor to a default field of view so that the blind spot created when the first sensor tracked the object is now covered by the field of view of the first sensor; and redirecting the second sensor back to the second field of view.

11. The computer program product according to claim 10, wherein adjusting comprises turning the at least one second sensor.

12. The computer program product according to claim 10, wherein adjusting comprises adjusting a viewing angle of the at least one second sensor.

13. The computer program product according to claim 10, wherein adjusting comprises adjusting the at least one first sensor associated with the presentational device of the vehicle by turning of the at least one sensor, in order not to change an angle of view outputted to the driver while adjusting the at least one second sensor comprising at least one of turning of the at least one second senor or adjusting a viewing angle of the at least one second sensor in order to reduce the detected blind spot.

14. A system in a vehicle for reducing a blind spot associated with a presentational device associated with the vehicle, where the presentational device is intended to display objects outside a driver's direct field of vision, wherein a field of view of the presentational device is directed in a first specified direction at a side of the vehicle based on detections from a first sensor associated with the presentational device, wherein the first sensor is directed at the first specified direction for detecting objects located at the side of the vehicle within the first specified field of view of the presentational device, which said system comprises:

at least one first sensor, associated with the presentational device;

at least one second sensor, not associated with the presentational device; and a control unit configured to:

detect an object approaching a side of the vehicle;

control the first sensor to alter its field of view so as to track the object with the first sensor, as the object moves beside the vehicle longitudinal to a direction of travel of the vehicle;

detect a blind spot at the side of the vehicle of the presentational device, based on signals received from the at least one first sensor, wherein the blind spot is created as the first sensor alters its field of view while tracking the object as the object moves along the side of the vehicle;

adjust at least one second sensor with a second specified field of view to be redirected from a second specified direction that is directed at one of a front or a back of the vehicle to the first specified direction at the side of the vehicle such that the second specified field of view of the second sensor covers at least a portion of the second specified field of view and the first specified field of view of the presentation device so as to thereby cover at least a part of the detected blind spot;

output information captured by the at least one second sensor in the first specified direction at the side of the vehicle;

detect that the object has moved past the side of the vehicle;

redirect the field of view of the first sensor to a default field of view so that the blind spot created when the first sensor tracked the object is now covered by the field of view of the first sensor; and redirect the second sensor back to the second field of view.

15. The system according to claim 14, wherein the control signals are used to adjust the at least one second sensor by turning the at least one second sensor.

16. The system according to claim 14, wherein the control signals are used to adjust the at least one second sensor by adjustment of the viewing angle of the at least one second sensor.

17. The system according to claim 14, wherein the control signals are used for:

adjusting the at least one first sensor associated with the presentational device of the vehicle by turning of said at least one sensor, in order not to change an angle of view outputted to the driver; and adjusting the at least one second sensor by at least one of turning or adjusting a viewing angle in order to reduce the detected blind spot.

* * * * *